United States Patent
Surnilla et al.

(10) Patent No.: US 9,664,133 B2
(45) Date of Patent: May 30, 2017

(54) METHODS AND SYSTEMS FOR AN INTAKE OXYGEN SENSOR

(71) Applicant: Ford Global Technologies, LLC, Dearborn, MI (US)

(72) Inventors: Gopichandra Surnilla, West Bloomfield, MI (US); Daniel A. Makled, Dearborn, MI (US); Richard E. Soltis, Saline, MI (US); Stephen B. Smith, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/144,664

(22) Filed: May 2, 2016

(65) Prior Publication Data

US 2016/0245213 A1    Aug. 25, 2016

Related U.S. Application Data

(63) Continuation of application No. 14/032,109, filed on Sep. 19, 2013, now Pat. No. 9,328,684.

(51) Int. Cl.
*F02D 41/00* (2006.01)
*F02D 41/24* (2006.01)
(Continued)

(52) U.S. Cl.
CPC ....... *F02D 41/2474* (2013.01); *F02D 41/003* (2013.01); *F02D 41/005* (2013.01); *F02D 41/0007* (2013.01); *F02D 41/0032* (2013.01); *F02D 41/0042* (2013.01); *F02D 41/0045* (2013.01); *F02D 41/0072* (2013.01); *F02D 41/08* (2013.01); *F02D 41/123* (2013.01); *F02D 41/144* (2013.01); *F02D 41/1456* (2013.01);
(Continued)

(58) Field of Classification Search
CPC ........ F02M 26/08; F02M 26/07; F02M 26/06; F02D 41/2474; F02D 41/0007; F02D 41/003
USPC ............................................ 123/704, 568.11
See application file for complete search history.

(56) References Cited

U.S. PATENT DOCUMENTS

| | | | |
|---|---|---|---|
| 4,359,029 A | 11/1982 | Furuhashi et al. | |
| 4,494,374 A | 1/1985 | Kitahara et al. | |

(Continued)

FOREIGN PATENT DOCUMENTS

| | | |
|---|---|---|
| EP | 0005613 A2 | 11/1979 |
| EP | 0844380 B1 | 3/2003 |

*Primary Examiner* — Mahmoud Gimie
(74) *Attorney, Agent, or Firm* — Julia Voutyras; McCoy Russell LLP

(57) ABSTRACT

Methods and systems are provided for adjusting a reference voltage for an intake manifold oxygen sensor based on ingestion of hydrocarbons from a fuel system canister and/or an engine crankcase. During conditions when purge or crankcase ventilation hydrocarbons are ingested in the intake aircharge, the intake oxygen sensor is transitioned from operating at a lower reference voltage to a higher reference voltage where the effects of the ingested hydrocarbons on the sensor output are nullified. An EGR dilution of the intake aircharge is estimated based on the output of the sensor at the higher reference voltage while an amount of hydrocarbons ingested is estimated based on a difference between sensor outputs at the higher and lower reference voltages.

21 Claims, 5 Drawing Sheets

(51) Int. Cl.

| | |
|---|---|
| *F02M 26/06* | (2016.01) |
| *F02M 25/08* | (2006.01) |
| *F02D 41/08* | (2006.01) |
| *F02D 41/12* | (2006.01) |
| *F02D 41/14* | (2006.01) |
| *F02D 41/18* | (2006.01) |
| *F02D 41/40* | (2006.01) |
| *F02P 5/04* | (2006.01) |
| *F02P 5/15* | (2006.01) |
| *F02M 26/07* | (2016.01) |
| *F02M 26/08* | (2016.01) |
| *F02D 37/02* | (2006.01) |

(52) U.S. Cl.
CPC ......... *F02D 41/1476* (2013.01); *F02D 41/18* (2013.01); *F02D 41/40* (2013.01); *F02M 25/089* (2013.01); *F02M 25/0854* (2013.01); *F02M 26/06* (2016.02); *F02M 26/07* (2016.02); *F02M 26/08* (2016.02); *F02P 5/045* (2013.01); *F02P 5/1516* (2013.01); *F02D 37/02* (2013.01); *F02D 41/1458* (2013.01); *F02D 2041/001* (2013.01); *Y02T 10/144* (2013.01); *Y02T 10/44* (2013.01); *Y02T 10/46* (2013.01); *Y02T 10/47* (2013.01)

(56) References Cited

U.S. PATENT DOCUMENTS

| | | | |
|---|---|---|---|
| 4,601,273 A | | 7/1986 | Kitahara et al. |
| 4,614,175 A | | 9/1986 | Asayama |
| 4,617,900 A | * | 10/1986 | Kobayashi ............. F02M 23/04 123/684 |
| 4,945,882 A | | 8/1990 | Brown et al. |
| 5,201,303 A | | 4/1993 | Kojima |
| 5,392,598 A | | 2/1995 | White et al. |
| 5,481,462 A | * | 1/1996 | Nagai ................. F02D 41/0072 123/478 |
| 6,182,498 B1 | | 2/2001 | Mizutani et al. |
| 6,739,177 B2 | | 5/2004 | Sato et al. |
| 6,742,379 B2 | | 6/2004 | Matsubara et al. |
| 8,392,098 B2 | | 3/2013 | Yamashita |
| 8,522,760 B2 | | 9/2013 | Soltis |
| 8,857,155 B2 | | 10/2014 | Surnilla et al. |
| 9,163,575 B2 | | 10/2015 | Pursifull |
| 9,181,887 B2 | | 11/2015 | Surnilla et al. |
| 9,273,602 B2 | | 3/2016 | Surnilla et al. |
| 9,273,621 B2 | | 3/2016 | Surnilla et al. |
| 9,328,679 B2 | | 5/2016 | Clark et al. |
| 2009/0192694 A1 | | 7/2009 | Mullen |
| 2015/0075502 A1 | | 3/2015 | Surnilla et al. |
| 2015/0101564 A1 | | 4/2015 | Surnilla et al. |
| 2015/0121864 A1 | | 5/2015 | Surnilla et al. |

\* cited by examiner

METHODS AND SYSTEMS FOR AN INTAKE OXYGEN SENSOR

CROSS REFERENCE TO RELATED APPLICATIONS

The present application is a continuation of U.S. patent application Ser. No. 14/032,109, entitled "METHODS AND SYSTEMS FOR AN INTAKE OXYGEN SENSOR," filed on Sep. 19, 2013, the entire contents of which are hereby incorporated by reference for all purposes.

TECHNICAL FIELD

The present application relates generally to a gas constituent sensor included in an intake system of an internal combustion engine.

BACKGROUND AND SUMMARY

Engine systems may utilize recirculation of exhaust gas from an engine exhaust system to an engine intake system (intake passage), a process referred to as exhaust gas recirculation (EGR), to reduce regulated emissions. An EGR system may include various sensors to measure and/or control the EGR. As one example, the EGR system may include an intake gas constituent sensor, such as an oxygen sensor, which may be employed during non-EGR conditions to determine the oxygen content of fresh intake air. During EGR conditions, the sensor may be used to infer EGR based on a change in oxygen concentration due to addition of EGR as a diluent. One example of such an intake oxygen sensor is shown by Matsubara et al. in U.S. Pat. No. 6,742,379. The EGR system may additionally or optionally include an exhaust gas oxygen sensor coupled to the exhaust manifold for estimating a combustion air-fuel ratio.

As such, due to the location of the oxygen sensor downstream of a charge air cooler in the high pressure air induction system, the sensor may be sensitive to the presence of fuel vapor and other reductants and oxidants such as oil mist. For example, during boosted engine operation, purge air may be received at a compressor inlet location. Hydrocarbons ingested from purge air, positive crankcase ventilation (PCV) and/or rich EGR can consume oxygen on the sensor catalytic surface and reduce the oxygen concentration detected by the sensor. In some cases, the reductants may also react with the sensing element of the oxygen sensor. The reduction in oxygen at the sensor may be incorrectly interpreted as a diluent when using the change in oxygen to estimate EGR. Thus, the sensor measurements may be confounded by the various sensitivities, and the accuracy of the sensor, and thus, measurement and/or control of EGR, may be reduced.

In one example, some of the above issues may be addressed by a method for an engine comprising: in response to ingestion of purge or crankcase hydrocarbons during EGR flow, increasing a reference voltage applied to an intake manifold oxygen sensor; and adjusting EGR flow to the engine based on an output of the sensor at the increased reference voltage. In this way, the hydrocarbon effect on the sensor can be nullified and the accuracy of EGR estimation can be improved.

For example, during EGR conditions when purging and/or positive crankcase ventilation (PCV) is not enabled, a lower (nominal) reference voltage may be applied to the intake manifold oxygen sensor and EGR may be estimated based on a pumping current output by the sensor upon applying the nominal voltage. By comparing a change in the sensor output upon applying the lower voltage relative to a reference point indicative of sensor output during no EGR, the corresponding change in oxygen concentration can be used to infer the EGR dilution of the intake aircharge. An EGR flow can then be adjusted based on the estimated EGR relative to a desired EGR flow. In comparison, during EGR conditions when purging and/or PCV is enabled, a higher reference voltage may be applied to the intake manifold oxygen sensor and EGR may be estimated based on a pumping current output by the sensor upon applying the higher voltage. For example, the nominal reference voltage may be 450 mV while the higher voltage may be at or above 800 mV. At the higher voltage, the intake oxygen sensor goes from reacting hydrocarbons with oxygen at the sensor to dissociating the products of the reaction (namely, water and carbon dioxide). The sensor output at the higher voltage therefore reflects the oxygen concentration due to the EGR dilution effect only and not the oxygen reduction due to reaction of the ingested hydrocarbons on the sensing element. By comparing a change in the sensor output upon applying the higher voltage relative to a reference point indicative of sensor output during no EGR, the corresponding change in oxygen concentration can be used to estimate the EGR dilution of the intake aircharge and accurately adjust an EGR flow.

In this way, by applying a higher reference voltage to an intake manifold oxygen sensor during purging and crankcase ventilation conditions, the effect of the ingested hydrocarbons on the output of the sensor can be nullified. As such, this reduces the corruption of the sensor output in the presence of purge air or blow-by gas hydrocarbons. By improving the accuracy of EGR dilution estimation in the presence of purge air or crankcase gases, EGR control can be improved.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
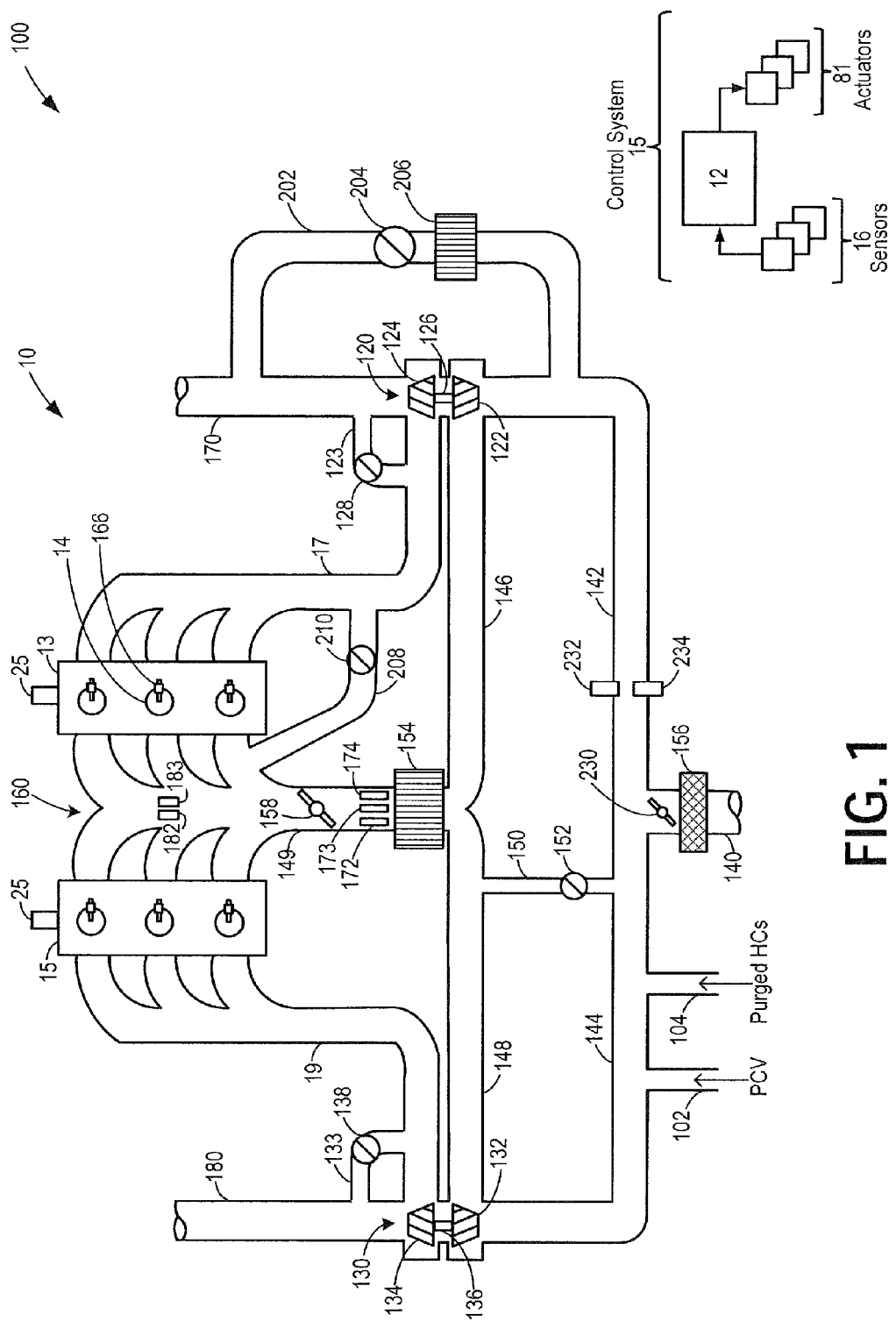
FIGS. 1-2 are schematic diagrams of an engine system.
Figure 2:
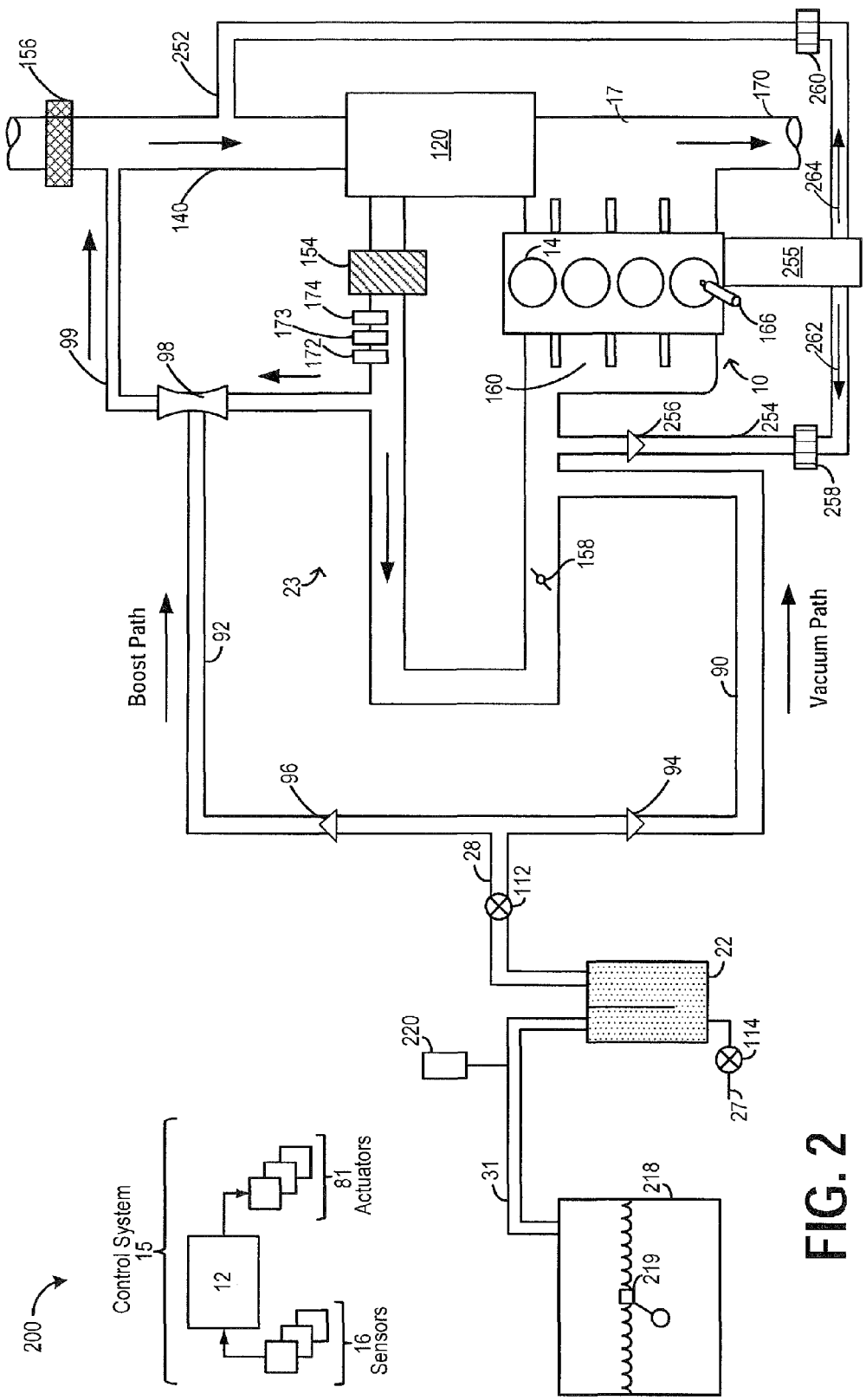
Figure 3:
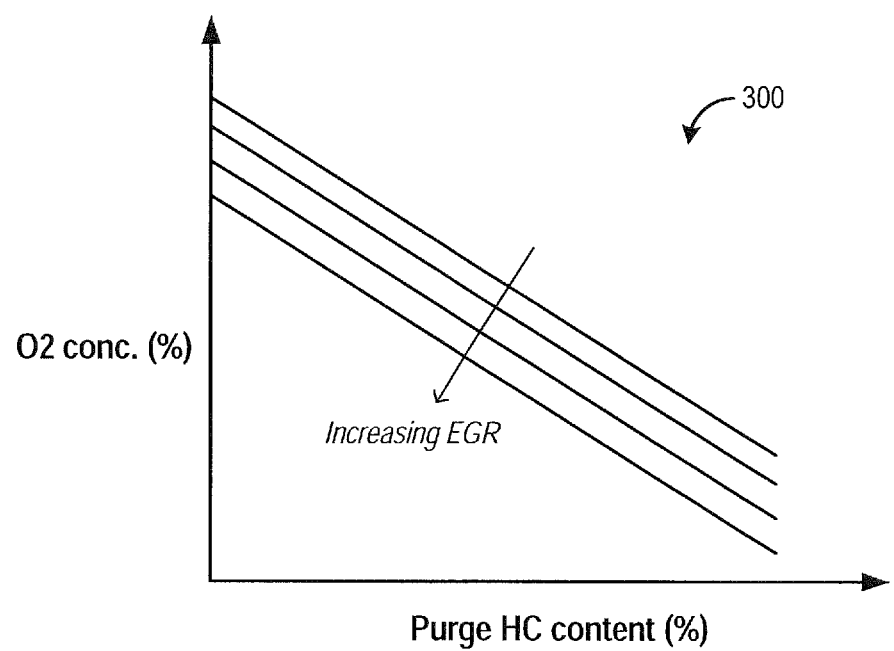
FIG. 3 is a map depicting the impact of purge air on the oxygen concentration estimated by an intake manifold oxygen sensor.

The present description is related to methods and system for using an intake manifold sensor for sensing an amount of EGR flow to an engine system, such as the engine systems of FIGS. 1-2. A reference voltage applied to the sensor may be adjusted based on the presence of purge or crankcase ventilation hydrocarbons. A controller may be configured to perform a control routine, such as the routine of FIGS. 4-5 to learn an amount of purge and/or crankcase hydrocarbons ingested into an engine and adjust an EGR flow accordingly. An output of the sensor, as well as an EGR dilution estimated by the sensor, may be adjusted to compensate for the effect of purge and/or crankcase hydrocarbons on the output of the sensor (FIG. 3). In this way, accuracy of EGR estimation by an intake oxygen sensor is increased.

FIG. 1 shows a schematic depiction of an example turbocharged engine system 100 including a multi-cylinder internal combustion engine 10 and twin turbochargers 120 and 130. As one non-limiting example, engine system 100 can be included as part of a propulsion system for a passenger vehicle. Engine system 100 can receive intake air via intake passage 140. Intake passage 140 can include an air filter 156 and an EGR throttle valve 230. Engine system 100 may be a split-engine system wherein intake passage 140 is branched downstream of EGR throttle valve 230 into first and second parallel intake passages, each including a turbocharger compressor. Specifically, at least a portion of intake air is directed to compressor 122 of turbocharger 120 via a first parallel intake passage 142 and at least another portion of the intake air is directed to compressor 132 of turbocharger 130 via a second parallel intake passage 144 of the intake passage 140.

The first portion of the total intake air that is compressed by compressor 122 may be supplied to intake manifold 160 via first parallel branched intake passage 146. In this way, intake passages 142 and 146 form a first parallel branch of the engine's air intake system. Similarly, a second portion of the total intake air can be compressed via compressor 132 where it may be supplied to intake manifold 160 via second parallel branched intake passage 148. Thus, intake passages 144 and 148 form a second parallel branch of the engine's air intake system. As shown in FIG. 1, intake air from intake passages 146 and 148 can be recombined via a common intake passage 149 before reaching intake manifold 160, where the intake air may be provided to the engine.

A first EGR throttle valve 230 may be positioned in the engine intake upstream of the first and second parallel intake passages 142 and 144, while a second air intake throttle valve 158 may be positioned in the engine intake downstream of the first and second parallel intake passages 142 and 144, and downstream of the first and second parallel branched intake passages 146 and 148, for example, in common intake passage 149.

In some examples, intake manifold 160 may include an intake manifold pressure sensor 182 for estimating a manifold pressure (MAP) and/or an intake manifold temperature sensor 183 for estimating a manifold air temperature (MCT), each communicating with controller 12. Intake passage 149 can include a charge air cooler (CAC) 154 and/or a throttle (such as second throttle valve 158). The position of throttle valve 158 can be adjusted by the control system via a throttle actuator (not shown) communicatively coupled to controller 12. An anti-surge valve 152 may be provided to selectively bypass the compressor stages of turbochargers 120 and 130 via bypass passage 150. As one example, anti-surge valve 152 can open to enable flow through bypass passage 150 when the intake air pressure upstream of the compressors attains a threshold value.

Intake manifold 160 may further include an intake gas oxygen sensor 172. In one example, the oxygen sensor is a UEGO sensor. As elaborated herein, the intake gas oxygen sensor may be configured to provide an estimate regarding the oxygen content of fresh air received in the intake manifold. In addition, when EGR is flowing, a change in oxygen concentration at the sensor may be used to infer an EGR amount and used for accurate EGR flow control. In the depicted example, oxygen sensor 162 is positioned upstream of throttle 158 and downstream of charge air cooler 154. However, in alternate embodiments, the oxygen sensor may be positioned upstream of the CAC. A pressure sensor 174 may be positioned alongside the oxygen sensor for estimating an intake pressure at which an output of the oxygen sensor is received. Since the output of the oxygen sensor is influenced by the intake pressure, a reference oxygen sensor output may be learned at a reference intake pressure. In one example, the reference intake pressure is a throttle inlet pressure (TIP) where pressure sensor 174 is a TIP sensor. In alternate examples, the reference intake pressure is a manifold pressure (MAP) as sensed by MAP sensor 182.

Engine 10 may include a plurality of cylinders 14. In the depicted example, engine 10 includes six cylinders arrange in a V-configuration. Specifically, the six cylinders are arranged on two banks 13 and 15, with each bank including three cylinders. In alternate examples, engine 10 can include two or more cylinders such as 3, 4, 5, 8, 10 or more cylinders. These various cylinders can be equally divided and arranged in alternate configurations, such as V, in-line, boxed, etc. Each cylinder 14 may be configured with a fuel injector 166. In the depicted example, fuel injector 166 is a direct in-cylinder injector. However, in other examples, fuel injector 166 can be configured as a port based fuel injector.

Intake air supplied to each cylinder 14 (herein, also referred to as combustion chamber 14) via common intake passage 149 may be used for fuel combustion and products of combustion may then be exhausted from via bank-specific parallel exhaust passages. In the depicted example, a first bank 13 of cylinders of engine 10 can exhaust products of combustion via a first parallel exhaust passage 17 and a second bank 15 of cylinders can exhaust products of combustion via a second parallel exhaust passage 19. Each of the first and second parallel exhaust passages 17 and 19 may further include a turbocharger turbine. Specifically, products of combustion that are exhausted via exhaust passage 17 can be directed through exhaust turbine 124 of turbocharger 120, which in turn can provide mechanical work to compressor 122 via shaft 126 in order to provide compression to the intake air. Alternatively, some or all of the exhaust gases flowing through exhaust passage 17 can bypass turbine 124 via turbine bypass passage 123 as controlled by wastegate 128. Similarly, products of combustion that are exhausted via exhaust passage 19 can be directed through exhaust turbine 134 of turbocharger 130, which in turn can provide mechanical work to compressor 132 via shaft 136 in order to provide compression to intake air flowing through the second branch of the engine's intake system. Alternatively, some or all of the exhaust gas flowing through exhaust passage 19 can bypass turbine 134 via turbine bypass passage 133 as controlled by wastegate 138.

In some examples, exhaust turbines 124 and 134 may be configured as variable geometry turbines, wherein controller 12 may adjust the position of the turbine impeller blades (or vanes) to vary the level of energy that is obtained from the exhaust gas flow and imparted to their respective compressor. Alternatively, exhaust turbines 124 and 134 may be configured as variable nozzle turbines, wherein controller 12 may adjust the position of the turbine nozzle to vary the level of energy that is obtained from the exhaust gas flow and imparted to their respective compressor. For example, the control system can be configured to independently vary the vane or nozzle position of the exhaust gas turbines 124 and 134 via respective actuators.

Exhaust gases in first parallel exhaust passage 17 may be directed to the atmosphere via branched parallel exhaust passage 170 while exhaust gases in second parallel exhaust passage 19 may be directed to the atmosphere via branched parallel exhaust passage 180. Exhaust passages 170 and 180 may include one or more exhaust after-treatment devices, such as a catalyst, and one or more exhaust gas sensors.

Engine 10 may further include one or more exhaust gas recirculation (EGR) passages, or loops, for recirculating at least a portion of exhaust gas from the exhaust manifold to the intake manifold. These may include high-pressure EGR loops for proving high-pressure EGR (HP-EGR) and low-pressure EGR-loops for providing low-pressure EGR (LP-EGR). In one example, HP-EGR may be provided in the absence of boost provided by turbochargers 120, 130, while LP-EGR may be provided in the presence of turbocharger boost and/or when exhaust gas temperature is above a threshold. In still other examples, both HP-EGR and LP-EGR may be provided simultaneously.

In the depicted example, engine 10 may include a low-pressure EGR loop 202 for recirculating at least some exhaust gas from the first branched parallel exhaust passage 170, downstream of the turbine 124, to the first parallel intake passage 142, upstream of the compressor 122. In some embodiments, a second low-pressure EGR loop (not shown) may be likewise provided for recirculating at least some exhaust gas from the second branched parallel exhaust passage 180, downstream of the turbine 134, to the second parallel intake passage 144, upstream of the compressor 132. LP-EGR loop 202 may include LP-EGR valve 204 for controlling an EGR flow (i.e., an amount of exhaust gas recirculated) through the loops, as well as an EGR cooler 206 for lowering a temperature of exhaust gas flowing through the EGR loop before recirculation into the engine intake. Under certain conditions, the EGR cooler 206 may also be used to heat the exhaust gas flowing through LP-EGR loop 202 before the exhaust gas enters the compressor to avoid water droplets impinging on the compressors.

Engine 10 may further include a first high-pressure EGR loop 208 for recirculating at least some exhaust gas from the first parallel exhaust passage 17, upstream of the turbine 124, to intake manifold 160, downstream of intake throttle 158. Likewise, the engine may include a second high-pressure EGR loop (not shown) for recirculating at least some exhaust gas from the second parallel exhaust passage 18, upstream of the turbine 134, to the second branched parallel intake passage 148, downstream of the compressor 132. EGR flow through HP-EGR loops 208 may be controlled via HP-EGR valve 210.

A PCV port 102 may be configured to deliver crankcase ventilation gases (blow-by gases) to the engine intake manifold along second parallel intake passage 144. In some embodiments, flow of PCV air through PCV port 102 may be controlled by a dedicated PCV port valve. Likewise, a purge port 104 may be configured to deliver purge gases from a fuel system canister to the engine intake manifold along passage 144. In some embodiments, flow of purge air through purge port 104 may be controlled by a dedicated purge port valve.

Humidity sensor 232 and pressure sensor 234 may be included in only one of the parallel intake passages (herein, depicted in the first parallel intake air passage 142 but not in the second parallel intake passage 144), downstream of EGR throttle valve 230. Specifically, the humidity sensor and the pressure sensor may be included in the intake passage not receiving the PCV or purge air. Humidity sensor 232 may be configured to estimate a relative humidity of the intake air. In one embodiment, humidity sensor 232 is a UEGO sensor configured to estimate the relative humidity of the intake air based on the output of the sensor at one or more voltages. Since purge air and PCV air can confound the results of the humidity sensor, the purge port and PCV port are positioned in a distinct intake passage from the humidity sensor. Pressure sensor 234 may be configured to estimate a pressure of the intake air. In some embodiments, a temperature sensor may also be included in the same parallel intake passage, downstream of the EGR throttle valve 230.

As such, intake oxygen sensor 172 may be used for estimating an intake oxygen concentration and inferring an amount of EGR flow through the engine based on a change in the intake oxygen concentration upon opening of the EGR valve 204. Specifically, a change in the output of the sensor upon opening the EGR valve is compared to a reference point where the sensor is operating with no EGR (the zero point). Based on the change (e.g., decrease) in oxygen amount from the time of operating with no EGR, an EGR flow currently provided to the engine can be calculated. For example, upon applying a reference voltage (Vs) to the sensor, a pumping current (Ip) is output by the sensor. The change in oxygen concentration may be proportional to the change in pumping current (delta Ip) output by the sensor in the presence of EGR relative to sensor output in the absence of EGR (the zero point). Based on a deviation of the estimated EGR flow from the expected (or target) EGR flow, further EGR control may be performed.

A zero point estimation of the intake oxygen sensor may be performed during idle conditions where intake pressure fluctuations are minimal and when no PCV or purge air is ingested into the low pressure induction system. In addition, the idle adaptation may be performed periodically, such as at every first idle following an engine start, to compensate for the effect of sensor aging and part-to-part variability on the sensor output.

A zero point estimation of the intake oxygen sensor may alternatively be performed during engine non-fueling conditions, such as during a deceleration fuel shut off (DFSO). By performing the adaptation during DFSO conditions, in addition to reduced noise factors such as those achieved during idle adaptation, sensor reading variations due to EGR valve leakage can be reduced.

Returning to FIG. 1, the position of intake and exhaust valves of each cylinder 14 may be regulated via hydraulically actuated lifters coupled to valve pushrods, or via a direct acting mechanical bucket system in which cam lobes are used. In this example, at least the intake valves of each cylinder 14 may be controlled by cam actuation using a cam actuation system. Specifically, the intake valve cam actuation system 25 may include one or more cams and may utilize variable cam timing or lift for intake and/or exhaust valves. In alternative embodiments, the intake valves may be controlled by electric valve actuation. Similarly, the exhaust valves may be controlled by cam actuation systems or electric valve actuation.

Engine system 100 may be controlled at least partially by a control system 15 including controller 12 and by input from a vehicle operator via an input device (not shown). Control system 15 is shown receiving information from a plurality of sensors 16 (various examples of which are described herein) and sending control signals to a plurality of actuators 81. As one example, sensors 16 may include humidity sensor 232, intake air pressure sensor 234, MAP sensor 182, MCT sensor 183, TIP sensor 174, and intake air oxygen sensor 172. In some examples, common intake passage 149 may further include a throttle inlet temperature sensor for estimating a throttle air temperature (TCT). In other examples, one or more of the EGR passages may include pressure, temperature, and air-to-fuel ratio sensors, for determining EGR flow characteristics. As another example, actuators 81 may include fuel injector 166, HP-EGR valves 210 and 220, LP-EGR valves 204 and 214, throttle valves 158 and 230, and wastegates 128, 138. Other actuators, such as a variety of additional valves and throttles, may be coupled to various locations in engine system 100. Controller 12 may receive input data from the various sensors, process the input data, and trigger the actuators in response to the processed input data based on instruction or code programmed therein corresponding to one or more routines. Example control routines are described herein with regard to FIGS. 4-5.

Now turning to FIG. 2, another example embodiment 200 of the engine of FIG. 1 is shown. As such, components previously introduced in FIG. 1 are numbered similarly and not re-introduced here for reasons of brevity.

Embodiment 200 shows a fuel tank 218 configured to deliver fuel to engine fuel injectors. A fuel pump (not shown) immersed in fuel tank 218 may be configured to pressurize fuel delivered to the injectors of engine 10, such as to injector 166. Fuel may be pumped into the fuel tank from an external source through a refueling door (not shown). Fuel tank 218 may hold a plurality of fuel blends, including fuel with a range of alcohol concentrations, such as various gasoline-ethanol blends, including E10, E85, gasoline, etc., and combinations thereof. A fuel level sensor 219 located in fuel tank 218 may provide an indication of the fuel level to controller 12. As depicted, fuel level sensor 219 may comprise a float connected to a variable resistor. Alternatively, other types of fuel level sensors may be used. One or more other sensors may be coupled to fuel tank 218 such as a fuel tank pressure transducer 220 for estimating a fuel tank pressure.

Vapors generated in fuel tank 218 may be routed to fuel vapor canister 22, via conduit 31, before being purged to engine intake 23. These may include, for example, diurnal and refueling fuel tank vapors. The canister may be filled with an appropriate adsorbent, such as activated charcoal, for temporarily trapping fuel vapors (including vaporized hydrocarbons) generated in the fuel tank. Then, during a later engine operation, when purge conditions are met, such as when the canister is saturated, the fuel vapors may be purged from the canister into the engine intake by opening canister purge valve 112 and canister vent valve 114.

Canister 22 includes a vent 27 for routing gases out of the canister 22 to the atmosphere when storing, or trapping, fuel vapors from fuel tank 218. Vent 27 may also allow fresh air to be drawn into fuel vapor canister 22 when purging stored fuel vapors to engine intake 23 via purge lines 90 or 92 (depending on boost level) and purge valve 112. While this example shows vent 27 communicating with fresh, unheated air, various modifications may also be used. Vent 27 may include a canister vent valve 114 to adjust a flow of air and vapors between canister 22 and the atmosphere. The vent valve may be opened during fuel vapor storing operations (for example, during fuel tank refueling and while the engine is not running) so that air, stripped of fuel vapor after having passed through the canister, can be pushed out to the atmosphere. Likewise, during purging operations (for example, during canister regeneration and while the engine is running), the vent valve may be opened to allow a flow of fresh air to strip the fuel vapors stored in the canister.

Fuel vapors released from canister 22, for example during a purging operation, may be directed into engine intake manifold 160 via purge line 28. The flow of vapors along purge line 28 may be regulated by canister purge valve 112, coupled between the fuel vapor canister and the engine intake. The quantity and rate of vapors released by the canister purge valve may be determined by the duty cycle of an associated canister purge valve solenoid (not shown). As such, the duty cycle of the canister purge valve solenoid may be determined by the vehicle's powertrain control module (PCM), such as controller 12, responsive to engine operating conditions, including, for example, engine speed-load conditions, an air-fuel ratio, a canister load, etc.

An optional canister check valve (not shown) may be included in purge line 28 to prevent intake manifold pressure from flowing gases in the opposite direction of the purge flow. As such, the check valve may be necessary if the canister purge valve control is not accurately timed or the canister purge valve itself can be forced open by a high intake manifold pressure. An estimate of the manifold absolute pressure (MAP) may be obtained from MAP sensor 174 coupled to intake manifold 160, and communicated with controller 12. Alternatively, MAP may be inferred from alternate engine operating conditions, such as mass air flow (MAF), as measured by a MAF sensor coupled to the intake manifold.

Purge hydrocarbons may be directed to intake manifold 160 via either a boost path 92 or a vacuum path 90 based on engine operating conditions. Specifically, during conditions when turbocharger 120 is operated to provide a boosted aircharge to the intake manifold, the elevated pressure in the intake manifold causes one-way valve 94 in the vacuum path 90 to close while opening one-way valve 96 in the boost path 92. As a result, purge air is directed into the air intake passage 140, downstream of air filter 156 and upstream of charge air cooler 154 via the boost path 92. Herein, the purge air is introduced upstream of intake air sensor 172. In some embodiments, as depicted, a venturi 98 may be positioned in the boost path such that the purge air is directed to the intake upon passing through the venturi and passage 99. This allows the flow of purge air to be advantageously harnessed for vacuum generation.

During conditions when engine 10 is operated without boost, elevated vacuum in the intake manifold causes one-way valve 94 in the vacuum path to open while closing one-way valve 96 in the boost path. As a result, purge air is directed into the intake manifold 160, downstream of throttle 158 via the vacuum path 90. Herein, the purge air is introduced downstream of intake air sensor 172.

PCV hydrocarbons may also be directed to intake manifold 160 via either a boost side PCV hose 252 or a vacuum side PCV hose 254 based on engine operating conditions. Specifically, blow-by gases from engine cylinders 14 flow past the piston rings and enter crankcase 255. During conditions when turbocharger 120 is operated to provide a boosted aircharge to the intake manifold, the elevated pressure in the intake manifold causes one-way valve 256 in vacuum side PCV hose 254 to close. As a result, during boosted engine operating, PCV gases flow in a first direction (arrow 262) and are received in the engine intake downstream of the intake oxygen sensor. Specifically, PCV air is directed into the air intake passage 140, downstream of air filter 156 and upstream of charge air cooler 154 via boost side PCV hose 252. The PCV flow may be directed to the intake passage upon passage through a boost side oil separator 260. The boost side oil separator may be integrated into the cam cover or may be an external component. Thus, during boosted conditions, the PCV gases are introduced upstream of intake oxygen sensor 172 and therefore do affect the output of oxygen sensor 172.

In comparison, during conditions when engine 10 is operated without boost, elevated vacuum in the intake manifold causes one-way valve 256 in the vacuum side PCV hose 254 to open. As a result, during non-boosted engine operating, PCV gases flow in a second direction (arrow 264) different from the first direction and are received in the engine intake downstream of the intake oxygen sensor. In the depicted example, the second direction of PCV flow during non-boosted engine operation is opposite of the first direction of PCV flow during boosted engine operation (compare arrows 262 and 264). Specifically, during non-boosted operation, PCV air is directed into the intake manifold 160, directly, downstream of throttle 158 via the vacuum side PCV hose 254. Herein, the PCV air is introduced downstream of intake oxygen sensor 172, and therefore does not affect the output of oxygen sensor 172. Thus, due to the specific engine configuration, during boosted engine operation, PCV and purge air hydrocarbons are ingested into the engine intake manifold upstream of the intake oxygen sensor and are ingested into the engine intake manifold downstream of the intake oxygen sensor during non-boosted conditions.

As previously discussed, the intake air oxygen sensor can be used to measure the amount of EGR in the intake aircharge as a function of the amount of change in oxygen content due to the addition of EGR as a diluent. Thus, as more EGR is introduced, the sensor may output a reading or pumping current corresponding to a lower oxygen concentration. During the estimation, a nominal reference voltage (e.g., at 450 mV), or Nernst voltage, is applied to the sensor and an output (e.g., a pumping current output by the sensor upon application of the lower reference voltage) is noted. Based on the output of the sensor relative to a zero point of the sensor (that is, sensor output at no EGR conditions), a change in oxygen concentration is learned, and an intake dilution with EGR is inferred.

However, if the EGR estimation is performed during conditions when purging and/or crankcase ventilation is enabled, an output of the sensor is corrupted. As such, purge air and/or positive crankcase ventilation hydrocarbons may be ingested during boosted engine operating conditions along boost path 92 and boost side PCV hose 252 when purge valve 112 is open and/or PCV valve 256 is closed. The sensor output may be corrupted primarily due to the ingested hydrocarbons reacting with ambient oxygen at the sensing element of the intake sensor. This reduces the (local) oxygen concentration read by the sensor. Since the output of the sensor and the change in oxygen concentration is used to infer an EGR dilution of intake aircharge, the reduced oxygen concentration read by the intake oxygen sensor in the presence of purge air and/or PCV may be incorrectly interpreted as additional diluent. This impacts the EGR estimation and the subsequent EGR control. Specifically, EGR may be over-estimated.

FIG. 3 depicts this variation in the reading of the intake sensor. Specifically, map 300 depicts an oxygen concentration estimated by an intake manifold oxygen sensor along the y-axis and a purge hydrocarbon (HC) content along the x-axis at a given EGR level. As the amount of purge HCs ingested into the low pressure induction system increases, such as when a purge valve is enabled during purging conditions, the hydrocarbons react with oxygen at the sensing element of the intake oxygen sensor. The oxygen is consumed and water and carbon dioxide is released. As a result, the estimated oxygen concentration is reduced, even though an amount of EGR flow may remain constant. This reduction in oxygen concentration estimated by the oxygen sensor may be inferred as an increased dilution (or replacement of oxygen with EGR). Thus, the controller may infer that there is a larger amount of EGR flow available than actually is present. If not corrected for the hydrocarbon effect, a controller may decrease EGR flow in response to an incorrect indication of higher EGR dilution, degrading EGR control. As such, it will be appreciated that PCV and purge hydrocarbons flow into the intake manifold (directly) during non-boosted conditions. Consequently, during non-boosted conditions, the purge and PCV flow is received downstream of the intake oxygen sensor and therefore do not confound the sensor results. However during boosted condition, the PCV and purge flow is received in the low pressure air induction system, upstream of the intake oxygen sensor. As a result, during the boosted conditions only, the sensor output is confounded by the purge and PCV flow.

Figure 4:
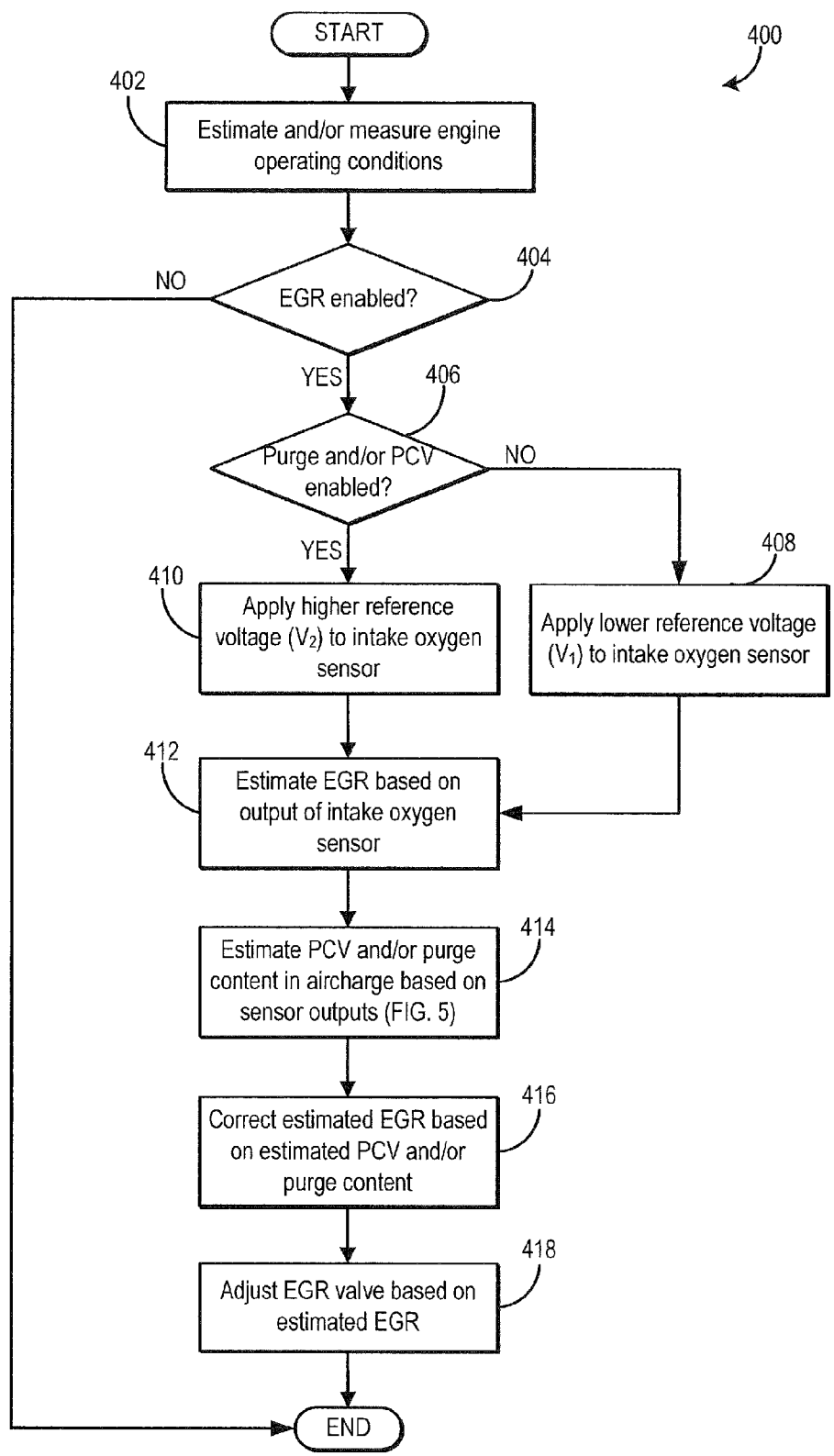
FIG. 4 depicts a flowchart for adjusting a reference voltage applied to an intake manifold sensor when sensing an EGR flow in the presence of purge or crankcase hydrocarbons.

As elaborated at FIG. 4, to reduce the hydrocarbon effect on the intake oxygen sensor, EGR estimation may be performed at a higher reference voltage when purge and/or PCV is enabled. By changing the intake oxygen sensor's reference voltage, or Nernst voltage, the sensor goes from reacting hydrocarbons with ambient oxygen at the sensor to dissociating the products of the reaction (water and carbon dioxide). At a defined elevated reference voltage, which is higher than the nominal reference voltage, such as at or above 800 mV, the sensor nullifies the effect of hydrocarbons and reads the oxygen reading only due to dilution effect (of EGR) and not due to the hydrocarbon effect of the purge or PCV air. In addition, as elaborated at FIG. 5, the reference voltage may be modulated between the higher voltage and the lower voltage, in the presence and absence of HCs from purge and PCV air, to estimate a purge and PCV content in the intake aircharge. An EGR flow estimated by the intake sensor can then be corrected to account for the effect of the purge and PCV hydrocarbons. As such, this improves the accuracy of EGR control.

It will be appreciated that in alternate examples, the intake oxygen sensor may be operated at the higher reference voltage at all times to eliminate the impact of the hydrocarbons on the EGR measurement.

Now turning to FIG. 4, a routine 400 is shown for adjusting a reference voltage applied to an intake manifold oxygen sensor based on purging and/or positive crankcase ventilation conditions being met. The approach allows for the hydrocarbon effect of the purge and PCV air to be nullified, improving the accuracy of EGR estimation.

At 402, the routine includes estimating and/or measuring engine operating conditions. These may include, for example, engine speed, torque demand, boost, EGR, engine dilution required, engine temperature, BP, MAP, etc. At 404, it may be determined if EGR is enabled. In one example, EGR may be enabled based on engine speed-load conditions where EGR benefits can be achieved. For example, EGR may be enabled when engine speed is above a threshold speed (e.g., above an idle speed) and when engine load is above a threshold load (e.g., above a minimum load). If EGR is not enabled, the routine may end.

At 406, it may be determined if one or more of canister purging conditions and positive crankcase ventilation (PCV) conditions have been met. Canister purging conditions may be met when a canister load is higher than a threshold, the engine is running, the engine is in a boosted condition, and a purge valve is open. PCV conditions may be met when the engine is operating boosted and a PCV valve 256 coupling the crankcase to the intake manifold along the vacuum side PCV hose is closed. During these conditions, PCV flow may be received along boosted side PCV hose 252. Specifically, the vacuum side PCV valve (or check valve) 256 will close under boost, and purge flow will go from the positive pressure in the crankcase to the lower (~atmospheric) pressure in the low pressure induction system. As such, if purge air is received in the intake aircharge, purge hydrocarbons (HCs) may be ingested along with exhaust residuals in the EGR. Likewise, if PCV is enabled, PCV hydrocarbons may be ingested in the intake aircharge. These hydrocarbons may react with oxygen at the sensing element of the intake oxygen sensor, generating carbon dioxide and water. The resulting lowering of oxygen concentration leads to a misrepresentation of engine dilution.

If purge air or PCV is not enabled, then at 408, the routine includes applying a lower reference voltage (Vi) to the intake manifold oxygen sensor. For example, a nominal voltage such as 450 mV may be applied. The lower reference voltage may be a voltage that does not cause dissociation of hydrocarbon-oxygen reaction products (water and carbon dioxide). As elaborated below, the controller may then adjust EGR flow to the engine based on an output of the senor at the lower reference voltage.

In comparison, if purge or PCV is enabled, then at 410, in response to ingestion of purge or crankcase hydrocarbons during EGR flow, the routine includes increasing a reference voltage applied to the intake manifold oxygen sensor. The controller may then adjust EGR flow to the engine based on an output of the sensor at the increased reference voltage. The increased reference voltage ($V_2$) applied to the intake oxygen sensor may be a voltage where an effect of the ingested hydrocarbons on the sensor is nullified. Specifically, the higher voltage may be a voltage that allows for the dissociation of the hydrocarbon-oxygen reaction products water and carbon dioxide. In one example, the higher reference voltage may be at or above a threshold voltage, such as at or above 800 mV. As elaborated below, the controller may then adjust EGR flow to the engine based on an output of the senor at the increased reference voltage.

Upon applying the higher reference voltage in the presence of purge and PCV air at 410, or upon applying the lower reference voltage in the absence of purge and PCV air at 408, the routine continues to 412 wherein an EGR flow to the engine intake is estimated based on the output of the sensor. Estimating the EGR flow includes estimating an oxygen concentration based on an output of the sensor (at the higher voltage if the higher voltage was applied or at the lower voltage if the lower voltage was applied). The routine then estimates an engine dilution based on the estimated oxygen concentration relative to a zero point. The zero point reflects an oxygen concentration estimated by the oxygen sensor in the absence of any EGR. The zero point of the sensor may be learned during one of an idle adaptation (during selected engine idling conditions) and a deceleration fuel shut off adaptation (during selected engine non-fueling conditions). As the amount of EGR dilution of intake aircharge increases, more intake oxygen may be displaced by EGR and a corresponding drop in intake oxygen sensor output may occur. Thus, based on the change in oxygen concentration estimated by the oxygen sensor, an amount of EGR flow may be estimated. In one example, the output of the sensor at either the higher or lower reference voltage is a pumping current (Ip) and the EGR estimation is based on a change in sensor output at the applied voltage relative to the zero point (previously estimated upon applying the same reference voltage).

Next, at 414, the routine includes estimating a PCV and/or purge content of the air charge (including the EGR flow) based on the output of the oxygen sensor. As elaborated at FIG. 5, the controller may modulate the reference voltage of the sensor (by decreasing the reference voltage applied to the oxygen sensor from the higher voltage to the lower voltage) and estimate an amount of purge and/or crankcase hydrocarbons ingested in the air charge and EGR flow based on the output of the sensor at the increased reference voltage relative to the output of the sensor at the decreased reference voltage.

At 416, the routine may correct the EGR flow to the engine (estimated at 412) based on the estimated amount of purge and crankcase ventilation hydrocarbons. For example, an amount of dilution corresponding to the purge or crankcase hydrocarbon content may be reduced from the EGR flow estimate.

At 418, a position of an EGR valve may be adjusted based on the corrected EGR flow. For example, the controller may adjust the position of an EGR valve coupled in a low pressure EGR passage, the passage recirculating exhaust residuals from downstream of an exhaust turbine to upstream of an intake compressor. The EGR flow may be adjusted based on a difference between the corrected EGR flow and a desired EGR flow. Thus, an opening of the EGR valve may be increased if the corrected EGR flow is less than the desired EGR flow, or decreased if the corrected EGR flow is more than the desired EGR flow. In addition, the EGR flow may be adjusted relative to intake airflow so as to maintain a fixed percentage of EGR flow relative to the intake airflow.

In some embodiments, the controller may also adjust an engine operating parameter based on the output of the sensor at the increased reference voltage. Likewise, the controller may also adjust one or more engine operating parameters based on the amount of purge and crankcase ventilation hydrocarbons (estimated at 414). The engine operating parameters adjusted may include, for example, one or more of spark timing, fuel injection timing and fuel injection amount.

In one example, during a first EGR condition, a controller may estimate EGR based on an intake manifold oxygen sensor operating at a higher reference voltage while during a second EGR condition, the controller may estimate EGR based on the intake manifold oxygen sensor operating at a lower reference voltage. The first EGR condition may include hydrocarbons being received in an engine intake from one or more of a fuel system canister and an engine crankcase, while the second EGR condition includes hydrocarbons not being received in the engine intake. The higher reference voltage may be a voltage where an effect of the hydrocarbons on the sensor is nullified, while the lower reference voltage is a voltage where an effect of the hydrocarbons on the sensor is not nullified. As such, during each of the first and second EGR conditions, an EGR valve may be adjusted based on the estimated EGR relative to a desired EGR flow to provide a fixed percentage of EGR relative to intake airflow Herein, estimating EGR during the first condition includes estimating a first oxygen concentration of intake aircharge based on an output of the sensor at the higher reference voltage, and inferring an EGR dilution of the intake aircharge based on the first oxygen concentration relative to a zero point of the sensor estimated at the higher reference voltage. Estimating EGR during the second condition includes estimating a second oxygen concentration of intake aircharge based on an output of the sensor at the lower reference voltage, and inferring an EGR dilution of the intake aircharge based on the second oxygen concentration relative to a zero point of the sensor estimated at the lower reference voltage. The EGR estimated during the first EGR condition at the higher reference voltage may be a first EGR amount. The controller may further, during the first EGR condition, apply the lower reference voltage to the sensor, estimate a second EGR amount based on the intake manifold oxygen sensor operating at a lower reference voltage, and infer an amount of hydrocarbons ingested during the first EGR condition based on a difference between the first EGR amount and the second EGR amount.

In another example, an engine system comprises an engine including an intake manifold and a crankcase, a turbocharger with an intake compressor, an exhaust turbine, and a charge air cooler, an intake throttle coupled to the intake manifold downstream of the charge air cooler and a canister configured to receive fuel vapors from a fuel tank, the canister coupled to the intake manifold. The engine system further comprises an EGR system including a passage for recirculating exhaust residuals from downstream of the turbine to upstream of the compressor via an EGR valve, an oxygen sensor coupled to the intake manifold, downstream of the charge air cooler and upstream of the intake throttle; and a controller with computer readable instructions. The controller may be configured to adjust a reference voltage applied to the oxygen sensor based on one of purging conditions and crankcase ventilation conditions being met, estimate an intake EGR dilution based on an output of the oxygen sensor; and adjust an opening of the EGR valve based on the estimated intake EGR dilution. Herein, adjusting the reference voltage includes, in response to one of purging conditions and crankcase ventilation conditions being met, applying a higher reference voltage where an effect of ingested hydrocarbons is nullified, and in response to none of purging conditions and crankcase ventilation conditions being met, applying a lower reference voltage. The controller may include further instructions for adjusting the higher reference voltage based on an amount of purge hydrocarbons or crankcase ventilation hydrocarbons ingested into the intake manifold, the reference voltage increased as the amount increases.

Figure 5:
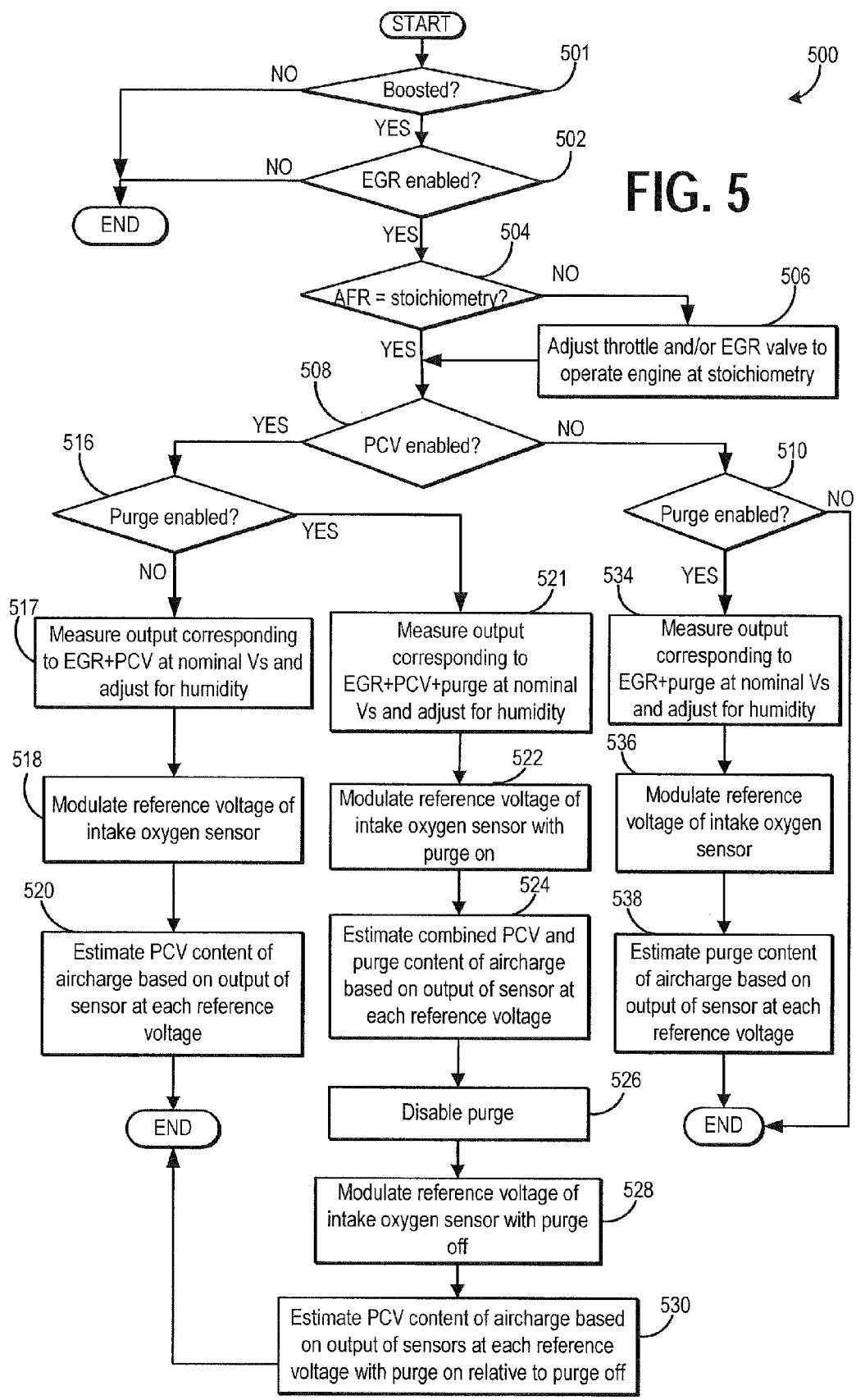
FIG. 5 depicts a flowchart for estimating a purge or crankcase content of EGR flow.

Now turning to FIG. 5, a routine 500 is shown for modulating a reference voltage applied to an intake manifold oxygen sensor to estimate a purge and/or positive crankcase ventilation content of aircharge delivered to the engine, including the purge content of the flowing EGR. The approach allows for an EGR estimate to be corrected for the purge and PCV hydrocarbon content, improving the accuracy of EGR estimation. As such, the routine of FIG. 5 may be performed during boosted engine operation when PCV flow and purge flow are received upstream of an intake oxygen sensor where their effect on EGR estimation can be learned and compensated for.

At 501, it may be confirmed that the engine is operating boosted. For example, it may be confirmed that the engine is operating with boost pressure higher than a threshold. At 502, it may be determined if EGR is enabled. For example, it may be determined if engine speed-load conditions are above a threshold where engine dilution can provide fuel economy and emissions benefits. In addition, it may be determined if the EGR valve is open. If EGR is not enabled, the routine may end.

At 504, it may be determined if the combustion air-fuel ratio is at or around stoichiometry. If not, at 506, engine operating parameters may be adjusted to operate the engine at stoichiometry. For example, an intake throttle and/or the EGR valve may be adjusted to operate the engine at stoichiometry. By ensuring that the exhaust is stoichiometric before proceeding further with the routine, the effects of a rich or lean exhaust on the output of the intake oxygen sensor are reduced.

At 508, it is determined if positive crankcase ventilation (PCV) is enabled. In one example, PCV may be enabled during boosted engine operation when a PCV valve on the vacuum side PCV hose is closed. During this condition, PCV may be delivered upstream of an intake oxygen sensor used to estimate EGR flow. If PCV is enabled for delivery upstream of the intake oxygen sensor, at 516, it may be determined if purge is also enabled. For example, it may be determined if canister purging conditions have been met and a canister purge valve is open.

If each of purge air and PCV is enabled for delivery upstream of the intake oxygen sensor, then at 521, the routine includes measuring an intake oxygen sensor output corresponding to a combination of EGR flow, PCV flow, and purge flow at a nominal reference voltage, the sensor output adjusted for ambient humidity. Herein, the nominal reference voltage is a first, lower reference voltage. Next, at 522, the routine includes, while flowing EGR, modulating a reference voltage of an intake manifold oxygen sensor. Modulating the reference voltage of the oxygen sensor includes alternating between applying the first, lower reference voltage and a second, higher reference voltage. The first voltage is a voltage (e.g., 450 mV) where the effect of purge and PCV hydrocarbons on the sensor is not nullified while the second voltage (e.g., 800 mV or higher) is a voltage where the hydrocarbon effect is nullified.

At 524, the routine includes estimating an amount (total amount) of purge and crankcase ventilation hydrocarbons in the EGR based on sensor output during the modulating. Specifically, the total purge and PCV content in the EGR is estimated based on a difference (herein also referred to as delta Ip) between a first pumping current output by the sensor upon applying the first reference voltage and a second pumping current output by the sensor upon applying the second reference voltage.

At 526, purge may be selectively disabled. Specifically, the purge valve may be closed while the PCV valve is held open. Next, at 528, the routine includes re-modulating the reference voltage of the intake oxygen sensor. Thus, while the initial modulating of the reference voltage (at 522) is done with purge on, the subsequent modulating of the reference voltage is performed with purge off. At 530, an amount of crankcase ventilation hydrocarbons in the EGR is differentiated from an amount of purge hydrocarbons in the EGR based on intake oxygen sensor output during the re-modulating. The differentiating includes differentiating based on a first difference between first and second pumping currents output by the sensor during the modulating and a second difference between first and second pumping currents output by the sensor during the re-modulating. Herein, the first difference estimated during the modulating is indicative of a total amount of purge and crankcase ventilation hydrocarbons in the EGR, while the second difference estimated during the re-modulating is indicative of a crankcase ventilation content of the total amount of purge and crankcase ventilation hydrocarbons in the EGR. Thus, by comparing delta Ip obtained with purge on with the delta Ip obtained with purge off, a PCV content of the EGR may be determined. Then, based on the total amount of hydrocarbons estimated at 524, a purge content of the EGR may be computed.

For example, the intake oxygen sensor can be operated nominally at a lower reference voltage of 450 mV while measuring EGR and the output may be noted as iao2_ip_nominal. Periodically, the reference voltage may be changed to a higher reference voltage to measure the dilution by nullifying the impact of the purge and PCV hydrocarbons. This measurement at the higher reference voltage may be noted as iao2_ip_hi_vs. By taking the difference in the measurement at the nominal reference voltage and the higher reference voltage, the combined impact of the PCV and purge hydrocarbons (iao2_hc_meas) can be estimated as:

$$iao2\_hc\_meas = iao2\_ip\_nominal - iao2\_ip\_hi\_vs.$$

To further separate the hydrocarbon effect of purge and PCV, the above voltage modulation is first repeated with purge on to get the hydrocarbon effect as:

iao2_hc_meas_tot=iao2_hc_meas (with purge turned on) wherein iao2_hc_meas_tot is the total amount of PCV and purge hydrocarbons measured. Then, the measurement is repeated with purge off to estimate the PCV content as:

iao2_hc_meas_pcv=iao2_hc_meas (with purge turned off).

The hydrocarbon impact of the purge air is then calculated as:

$$iao2\_hc\_meas\_purge = iao2\_hc\_meas\_tot - iao2\_hc\_meas\_pcv.$$

Returning to FIG. 5, if only one of PCV and purge is enabled during the EGR, the modulating can be used to infer the hydrocarbon contribution of that parameter to the EGR. For example, if PCV is not enabled at 508 and purge is enabled at 510, then at 534, the routine includes measuring an intake oxygen sensor output corresponding to a combination of EGR flow and purge flow (and no PCV flow) at the nominal (first) reference voltage, the sensor output adjusted for ambient humidity. Then, at 536, the reference voltage may be modulated and at 538, the purge content of the EGR may be estimated based on the difference in pumping currents (delta Ip) output by the intake oxygen sensor at the higher and lower reference voltages.

For example, the pumping current at the higher reference voltage may be learned as Ip_hi_Vs. Then, a sensor output (or pumping current) corresponding to the EGR flow may be learned as:

$$Ip\_egr = (Ip\_hi\_Vs - Ip\_egr\_purge) * K,$$

wherein K is a conversion factor of pumping current (Ip) to EGR at the higher reference voltage, and wherein the purge content (Ip_purge) is learned as:

$$Ip\_purge = Ip\_egr\_purge - Ip\_egr.$$

Alternatively, if PCV is enabled at 508 and purge is not enabled at 516, then at 517, the routine includes measuring an intake oxygen sensor output corresponding to a combination of EGR flow and PCV flow (and no purge flow) at the nominal (first) reference voltage, the sensor output adjusted for ambient humidity. Then, at 518, the reference voltage may be modulated and at 520, the PCV content of the EGR may be estimated based on the difference in pumping currents (delta Ip) output by the intake oxygen sensor at the higher and lower reference voltages.

For example, the pumping current at the higher reference voltage may be learned as Ip_hi_Vs. Then, a sensor output (or pumping current) corresponding to the EGR flow may be learned as:

$$Ip\_egr = (Ip\_hi\_Vs - Ip\_egr\_PCV) * K,$$

wherein K is a conversion factor of pumping current (Ip) to EGR at the higher reference voltage, and wherein the PCV content (Ip_PCV) is learned as:

$$Ip\_PCV = Ip\_egr\_PCV - Ip\_egr.$$

As elaborated at FIG. 4, once the PCV and/or purge content has been accurately determined, the controller may correct the EGR flow estimate based on the PCV and/or purge content and adjust an EGR valve accordingly so as to provide a desired EGR flow. By compensating the EGR estimate determined using an intake manifold oxygen sensor for the effect of purge and PCV hydrocarbons, EGR control can be improved.

In one example, during a first EGR condition, with each of a purge valve and a PCV valve open, a controller may alternate a reference voltage of an intake manifold oxygen sensor between a first, lower voltage and a second, higher voltage, and estimate a total content of purge and PCV hydrocarbons in EGR based on sensor output. During a second EGR condition, with the purge valve closed and the PCV valve open, the controller may alternate the reference voltage of the intake manifold oxygen sensor between the first and second voltage, and differentiate a purge hydrocarbon content from a PCV hydrocarbon content based on sensor output. Herein, the second, higher voltage is a voltage where an effect of the PCV and purge hydrocarbons is nullified while the first, voltage is a voltage where the effect is not nullified. Estimating a total content of purge and PCV hydrocarbons in EGR based on sensor output during the first EGR condition includes estimating a total content based on a first difference between a first pumping current output by the sensor at the first voltage and a second pumping current output by the sensor at the second voltage. Differentiating a purge hydrocarbon content from a PCV hydrocarbon content based on sensor output during the second EGR condition includes estimating the PCV hydrocarbon content based on a second difference between a first pumping current output by the sensor at the first voltage and a second pumping current output by the sensor at the second voltage, and estimating the purge hydrocarbon content based on a difference between the total content estimated during the first EGR condition and the PCV hydrocarbon content estimated during the second EGR condition.

In another example, an engine system comprises: an engine including an intake manifold a crankcase coupled to the intake manifold via a PCV valve, a turbocharger with an intake compressor, an exhaust turbine, and a charge air cooler; and an intake throttle coupled to the intake manifold downstream of the charge air cooler. The system may further include a fuel vapor canister configured to receive fuel vapors from a fuel tank, the canister coupled to the intake manifold via a purge valve; and an EGR system including a passage for recirculating exhaust residuals from downstream of the turbine to upstream of the compressor via an EGR valve. An oxygen sensor may be coupled to the intake manifold, downstream of the charge air cooler and upstream of the intake throttle. An engine controller may be configured with computer readable instructions for: adjusting a reference voltage applied to the oxygen sensor based on one of purging conditions and crankcase ventilation conditions being met; estimating an intake EGR dilution based on an output of the oxygen sensor during the adjusting; and estimating a purge and crankcase ventilation hydrocarbon content of the intake EGR dilution based on the output of the oxygen sensor and further based on an opening of each of the PCV valve and the purge valve. The controller may include further instructions for adjusting an opening of the EGR valve based on the estimated intake EGR dilution and the estimated purge and crankcase ventilation hydrocarbon content of the intake EGR dilution. The adjusting may include correcting the estimated intake EGR dilution based on the estimated purge and crankcase ventilation hydrocarbon content of the intake EGR dilution and adjusting the opening of the EGR valve to bring the corrected EGR dilution towards a desired EGR dilution.

In this way, a higher reference voltage can be applied to an intake manifold oxygen sensor during conditions when hydrocarbons from purging and crankcase ventilation are ingested into the intake manifold. The higher voltage dissociates the products of the hydrocarbons reacting with oxygen at the sensor, nullifying the effect of the ingested hydrocarbons on the sensor output. This improves the reliability of an EGR dilution estimated based on the sensor output. In addition, the reference voltage can be modulated between the higher voltage and a nominal voltage, with purge air enabled and disabled, to distinguish the purge content of the ingested hydrocarbons from the PCV content. By correcting the EGR dilution estimation to account for the PCV and purge content, the accuracy of EGR estimation using an intake oxygen sensor is increased, improving engine EGR control.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-3, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for an engine, comprising:
   boosting engine intake air with a compressor in an engine air intake;
   injecting fuel to the engine with a direct in-cylinder injector;
   adjusting engine cylinder valve timing or lift with variable cam timing or lift;
   directing exhaust gas recirculation (EGR) flow to the engine;
   in response to ingestion of purge or crankcase hydrocarbons during EGR flow, increasing a reference voltage applied to an intake manifold oxygen sensor;
   adjusting EGR flow to the engine based on an output of the sensor at the increased reference voltage; and
   adjusting a fuel injection amount based on the output of the sensor at the increased reference voltage.

2. The method of claim 1, wherein the intake manifold oxygen sensor is downstream of the compressor.

3. The method of claim 1, further comprising adjusting a spark timing based on the output of the sensor at the increased reference voltage.

4. The method of claim 1, wherein purge air is directed into the engine intake downstream of an air filter and upstream of a charge air cooler.

5. The method of claim 1, wherein the output of the sensor at the increased reference voltage includes a pumping current.

6. The method of claim 1, wherein the increased reference voltage is a voltage where an effect of the ingested hydrocarbons on the sensor is nullified.

7. The method of claim 6, wherein the increased reference voltage is at or above 800 mV.

8. The method of claim 1, wherein the adjusting includes, estimating an oxygen concentration based on the output of the sensor at the increased reference voltage, estimating an engine dilution based on the estimated oxygen concentration relative to a zero point of the sensor, and adjusting EGR flow to the engine based on the estimated engine dilution relative to a desired engine dilution.

9. The method of claim 8, wherein the zero point of the sensor is learned during one of an idle adaptation and a deceleration fuel shut off adaptation.

10. The method of claim 1, wherein adjusting EGR flow includes adjusting a position of an EGR valve coupled in a low pressure EGR passage.

11. The method of claim 10, wherein the passage recirculates exhaust residuals from downstream of an exhaust turbine to upstream of the compressor.

12. The method of claim 1, wherein adjusting EGR flow includes adjusting EGR flow relative to intake airflow to maintain a fixed percentage of EGR flow relative to the intake airflow.

13. The method of claim 1, further comprising,
   decreasing the reference voltage applied to the intake manifold oxygen sensor;
   estimating an amount of purge or crankcase hydrocarbons ingested in the EGR flow based on the output of the sensor at the increased reference voltage relative to the output of the sensor at the decreased voltage; and
   further adjusting the EGR flow based on the amount of purge or crankcase hydrocarbons.

14. A method for an engine, comprising:
   in response to ingestion of purge or crankcase hydrocarbons during EGR flow,
      increasing a reference voltage applied to an intake manifold oxygen sensor; and adjusting EGR flow to the engine based on an output of the sensor at the increased reference voltage;

decreasing the reference voltage applied to the intake manifold oxygen sensor;

estimating an amount of purge or crankcase hydrocarbons ingested in the EGR flowbased on the output of the sensor at the increased reference voltage relative to the output of the sensor at the decreased voltage; and further adjusting the EGR flow based on the amount of purge or crankcase hydrocarbons.

15. The method of claim 14, wherein the output of the sensor at the increased reference voltage includes a pumping current.

16. The method of claim 14, wherein the increased reference voltage is a voltage where an effect of the ingested hydrocarbons on the sensor is nullified.

17. The method of claim 14, further comprising adjusting an engine operating parameter based on the output of the sensor at the increased reference voltage, the engine operating parameter including one or more of spark timing and fuel injection amount.

18. A method for an engine, comprising:
in response to ingestion of purge or crankcase hydrocarbons during EGR flow,
increasing a reference voltage applied to an intake manifold oxygen sensor; and
adjusting EGR flow to the engine based on an output of the sensor at the increased reference voltage, wherein the adjusting includes, estimating an oxygen concentration based on the output of the sensor at the increased reference voltage, estimating an engine dilution based on the estimated oxygen concentration relative to a zero point of the sensor, and adjusting EGR flow to the engine based on the estimated engine dilution relative to a desired engine dilution.

19. The method of claim 18, wherein the output of the sensor at the increased reference voltage includes a pumping current.

20. The method of claim 18, wherein the increased reference voltage is a voltage where an effect of the ingested hydrocarbons on the sensor is nullified.

21. The method of claim 20, wherein the increased reference voltage is at or above 800 mV.

* * * * *